June 4, 1946.　　C. M. FRIDEN ET AL　　2,401,473
CALCULATING MACHINE
Filed Oct. 29, 1943　　6 Sheets-Sheet 1

INVENTORS
CARL M. FRIDEN
ANTHONY B. MACHADO
BY
ATTORNEY

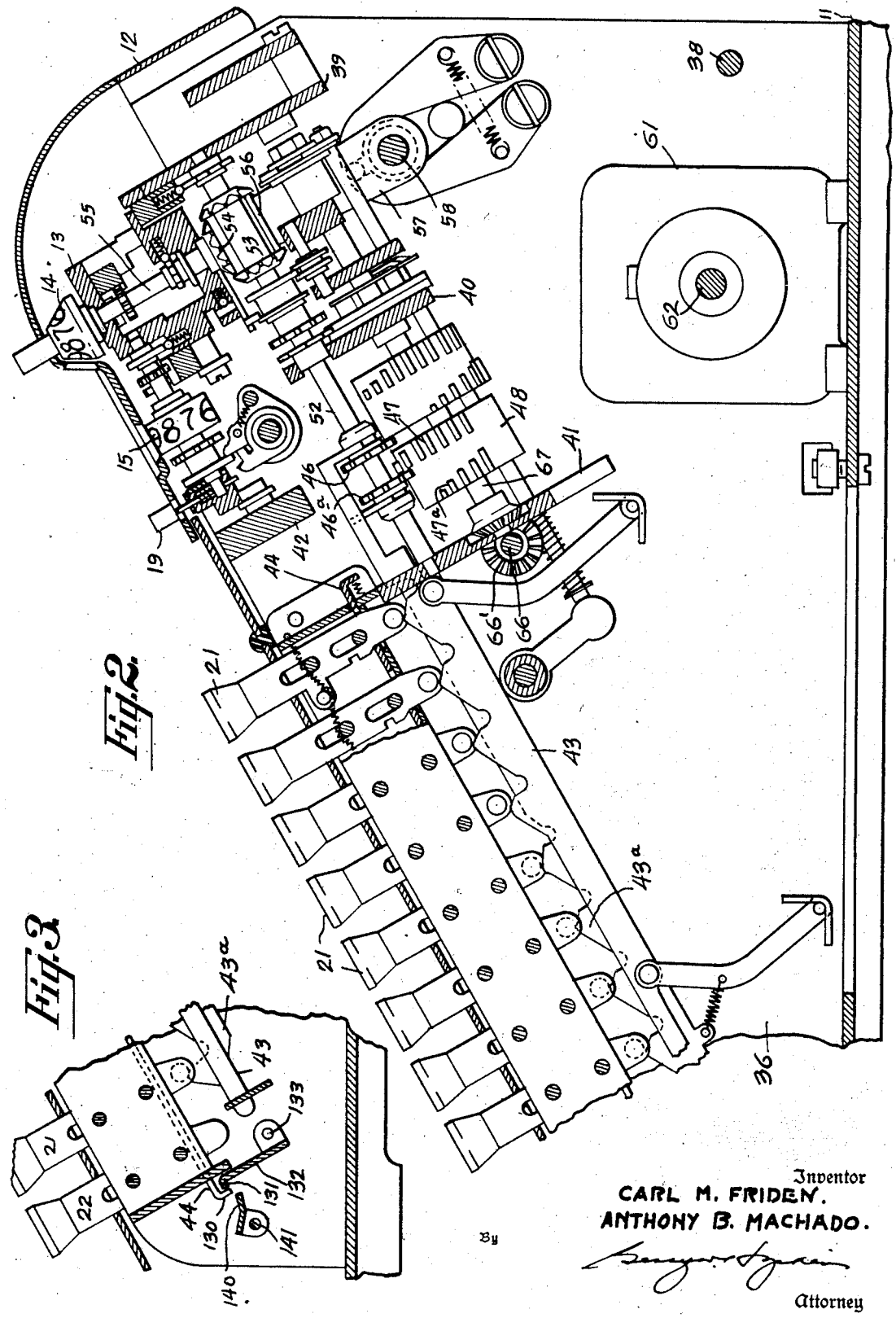

June 4, 1946.

C. M. FRIDEN ET AL 2,401,473

CALCULATING MACHINE

Filed Oct. 29, 1943

Inventors.
CARL M. FRIDEN.
ANTHONY B. MACHADO

Attorney

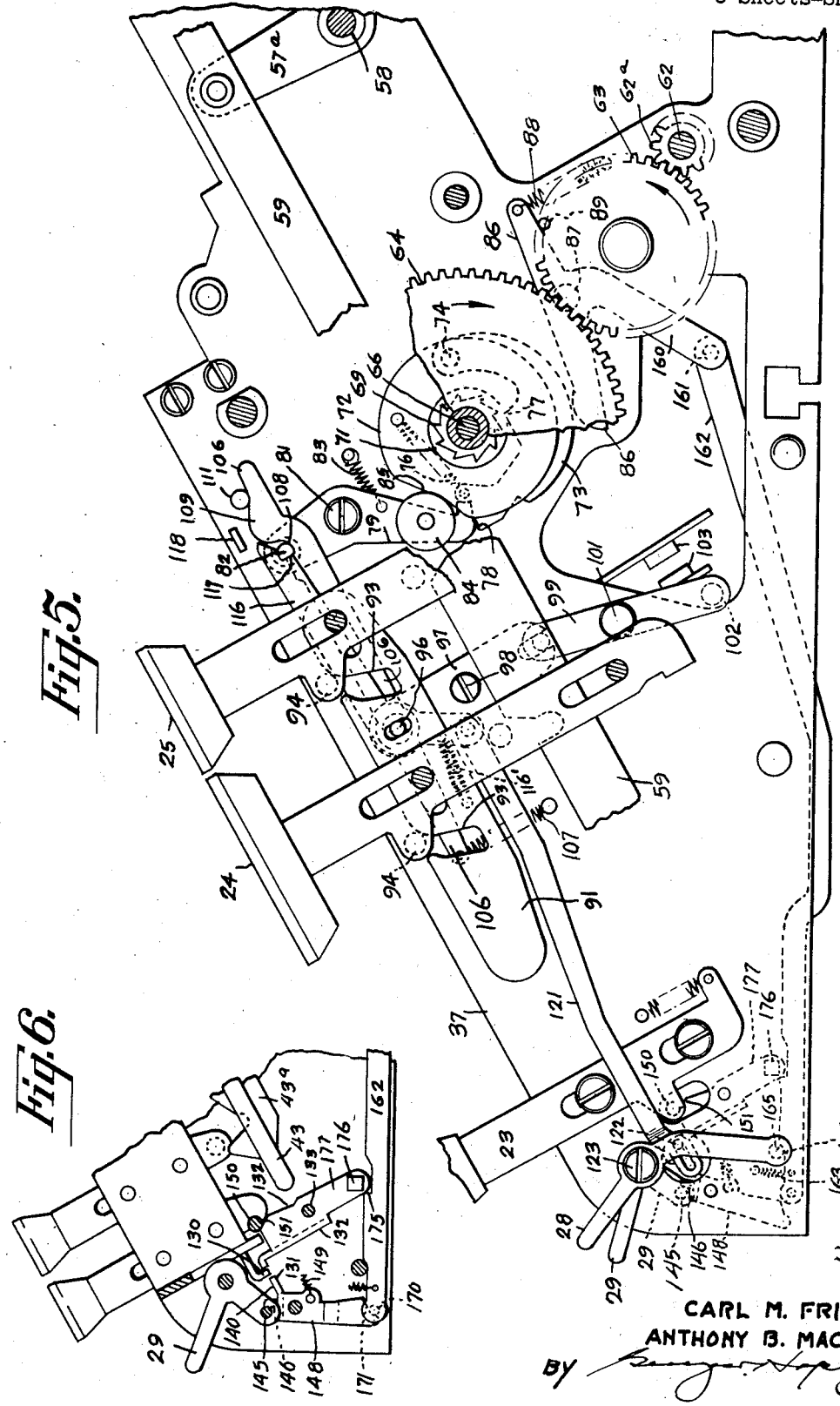

June 4, 1946.   C. M. FRIDEN ET AL   2,401,473
CALCULATING MACHINE
Filed Oct. 29, 1943   6 Sheets-Sheet 5

Inventors
CARL M. FRIDEN
ANTHONY B. MACHADO.
By
Attorney

INVENTORS
CARL M. FRIDEN,
ANTHONY B. MACHADO.
BY
ATTORNEY

Patented June 4, 1946

2,401,473

UNITED STATES PATENT OFFICE 2,401,473

CALCULATING MACHINE

Carl M. Friden, Pleasanton, and Anthony B. Machado, San Leandro, Calif., assignors to Friden Calculating Machine Co., Inc., a corporation of California Original application November 11, 1942, Serial No. 465,112. Divided and this application October 29, 1943, Serial No. 508,220

4 Claims. (Cl. 192—37)

This invention relates to calculating machines and is concerned more particularly with the provision of improved means for controlling calculating operations.

This application is a division of our co-pending application Serial No. 465,112, filed November 11, 1942.

It is an object of the invention to provide improved control means for the cyclic drive of a calculating machine whereby optional single cycle or plural cycle operations can be obtained under control of the same keys.

Other objects and advantages of the invention will be apparent from the following description of a preferred embodiment thereof, as illustrated in the accompanying drawings, in which:

Figure 2 is a vertical longitudinal sectional view of the machine taken as indicated by the line 2—2 in Figure 1.

Figure 3 is a continuation of the section of Figure 2 at the front end of the machine.

Figure 5 is a vertical longitudinal section to show the drive and drive control means of the calculating machine, the view being taken as indicated by the line 5—5 in Figure 1.

Figure 6 is a fragmentary section showing certain related parts of the keyboard clear or release mechanism and the keyboard lock mechanism. The view is indicated by the line 6—6 in Figure 4.

The invention is illustrated in connection with the type of calculating machine disclosed in the patent to Carl M. Friden, No. 2,229,889, dated January 28, 1941.

Figure 1:
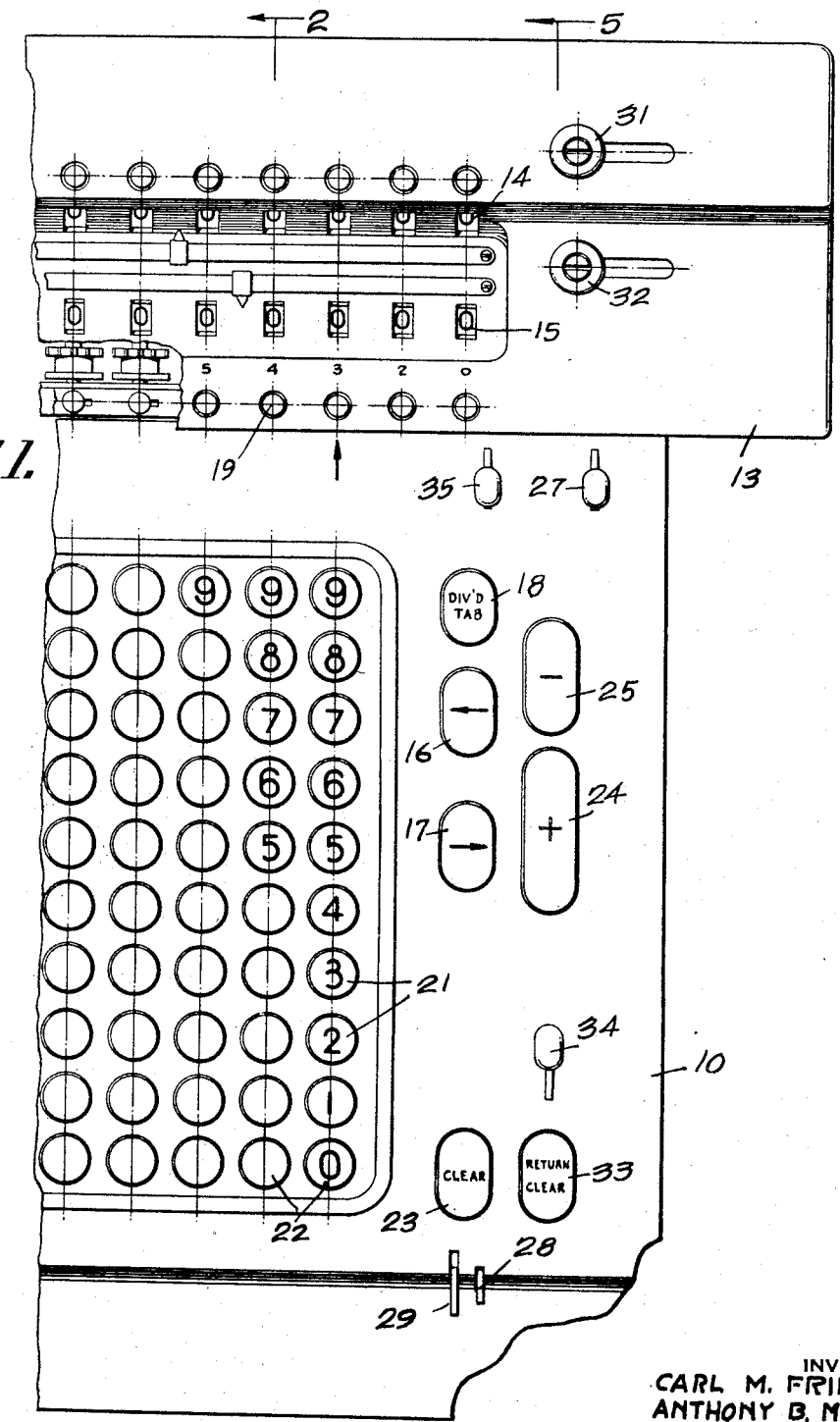
Figure 1 is a fragmentary plan view of a calculating machine embodying the invention.

Referring to Figures 1 and 2, the machine includes a body 10 comprising base 11 and casing 12 suitably secured thereon and in which the actuating, selecting and control mechanisms are mounted. Register carriage 13 is mounted for endwise shifting movement transversely of body 10 and carries numeral wheels or dials 14 and 15 of the accumulator and revolutions counter, respectively. Carriage 13 can be shifted by power in either direction by manipulation of respective shift keys 16 and 17 through suitable shift mechanism, or can be tabulated to a desired selected position by depression of tabulation control key 18 after setting of one of the selected ordinal tabulator keys 19.

Values are entered into the machine by depression of numeral keys 21 of the usual keyboard in the various ordinal rows thereof, keys 21 being releasable individually by depression of ordinal clear keys 22 or collectively by depression of keyboard clear key 23. Values introduced into the machine may be registered additively or subtractively on accumulator numeral wheels 14 by depression of plus key 24 or minus key 25, respectively. The number of registrations or its complement can be entered in counter numeral wheel 15 by proper setting of control lever 27. If desired, add lever 28 may be set to cause clearing of the keyboard after a single registration is entered. Numeral keys 21 may be locked in their adjusted position by appropriate setting of keyboard lock lever 29.

Values registered in numeral wheels 14 and 15 can be erased by manual operation of resetting handles 31 and 32 respectively, or by power through depression of return clear key 33.

The machine is adapted to perform automatic division by means of a conventional mechanism including division starting control lever 34. Division stop lever 35 is provided for terminating a division operation when the desired quotient figure is registered.

Within the casing 12, the frame includes left and right side plates 36 and 37 (Figs. 2 and 4) which are suitably mounted on base 11 and are inter-connected by various cross frame brackets including one or more tie rods 38 and transverse brackets 39, 40, 41 and 42 for supporting various mechanisms including the selecting and actuating mechanisms.

Values to be introduced into accumulator numeral wheels 14 are selected by means of a plurality of similar orders of conventional selecting mechanism including endwise movable slides 43, 43a (Figs. 2 and 3) associated with numeral keys 21 of each bank, keys 21 are latched in depressed position by a spring-urged latching slide 44 for each bank of keys. Keys 21 shift slides 43, 43a which position ten-tooth gears 46, 46a with respect to the stepped teeth 47, 47a of the associated actuating cylinder 48 so that selected increments of movement are transmitted to a square shaft 52 on which gears 46, 46a are slidably and non-rotatably mounted in the usual fashion. Each shaft 52 also carries a spool 53 bearing respective plus and minus gears at its ends for selective engagement with the ten-tooth gear 54 at the lower end of vertical shaft 55 on which numeral wheel or dial 14 is mounted.

The positioning of the plus-minus gears is controlled by means including a strap or gate 56 (Fig. 2) suitably mounted for rocking movement by a plurality of upright arms 57 carried by shaft 58. Shaft 58 is connected by arm 57a (Figs. 4 and 5) to a plus-minus slide 59 controlled by the plus and minus keys 24 and 25 in the usual fashion.

Clutch

Figure 4:
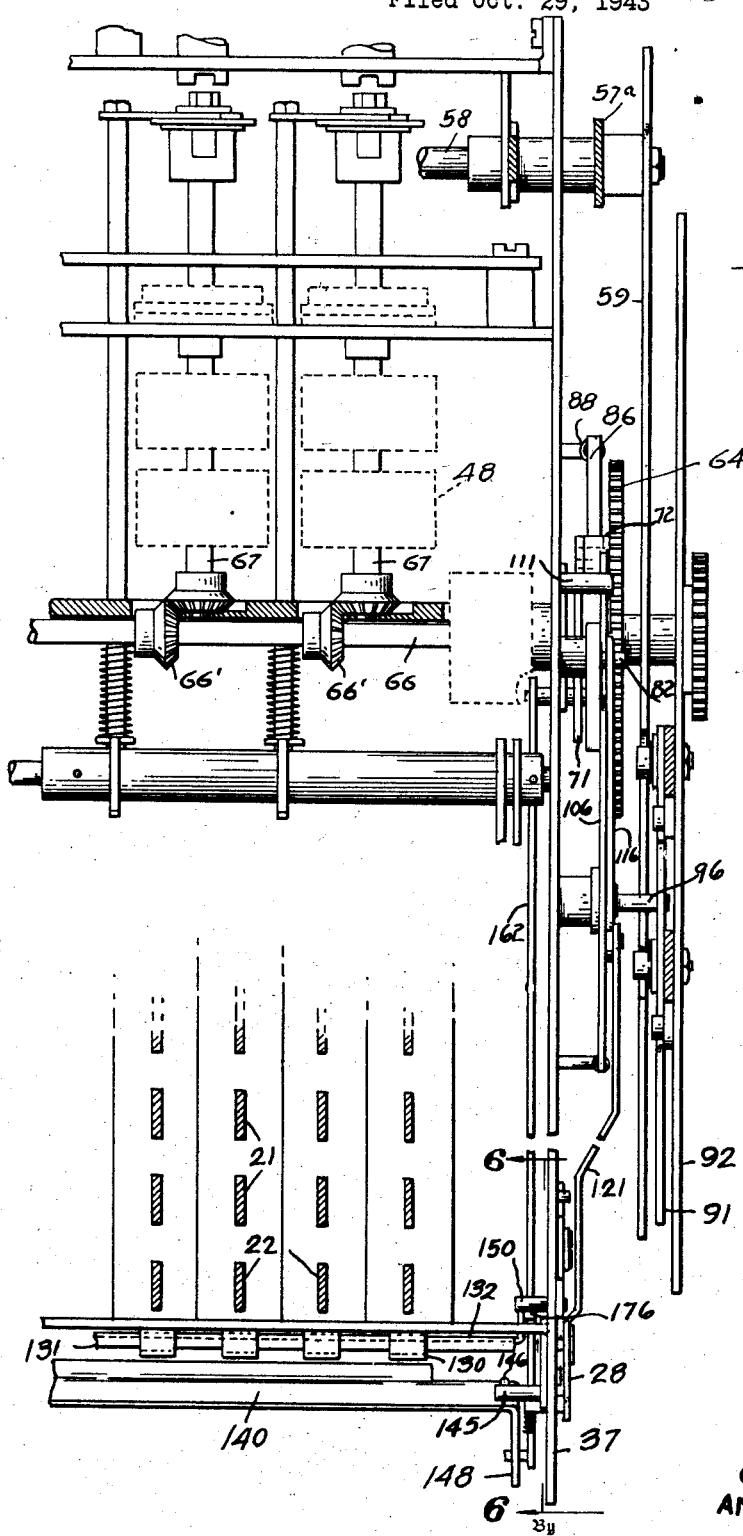
Figure 4 is a fragmentary plan view of the calculating machine with certain parts shown in section and others omitted to show certain details of the construction more clearly.

The drive mechanism which is controlled by any of the operation keys referred to includes a motor 61 (Fig. 2) having a drive shaft 62. A pinion 62a (Fig. 5) through intermediate gear 63 drives gear 64 which is journalled on shaft 66. A clutch is provided for connecting the drive gear 64 to shaft 66 which, as shown in Figure 4, extends transversely of the machine and through bevel gears 66' drives the actuating shafts 67 on which the actuating cylinders are mounted. Drive gear 64 (Fig. 5) carries a ratchet 69 which is disposed inside the driven portion of the clutch including disc 71 and ring 72 which rotates in unison with shaft 66. A clutch pawl 73 is pivoted at one end at 74 on the driven member of the clutch and has spring 76 attached to its other end to urge it toward the ratchet 69 so that its tooth 77 will engage with the teeth of the ratchet. At its free end the pawl 73 is provided with a shoulder 78 for engagement by the nose of a clutch control lever 79 pivoted at 81. The lever has a pin 82 by means of which it is operated as later described. A spring 83 urges the lever counterclockwise (Fig. 5) on its pivot 81.

Rotation of clutch control lever 79 clockwise from the position shown in Figure 5 serves to engage the clutch by releasing pawl 73, which then moves under the urgency of spring 76 to engage its tooth 77 with one of the teeth of ratchet 69, thus transmitting rotation from gear 64 to shaft 66. During rotation of the shaft 66 the control lever 79 is maintained rocked clockwise to its clutch engaging position for substantially a full cycle (irrespective of release of the pin 82) by the engagement of roller 84 on lever 79 with the periphery of ring 72. If lever 79 is released roller 84 seats in depression 85 in the ring 72 which is of sufficient extent to allow clutch control lever 79 to rock inwardly as the clutch driven ring 72 approaches full cycle position so that the nose of clutch control lever 79 can engage shoulder 78 on the clutch pawl 73. In this manner release of lever 79 causes disengagement of the clutch.

Figures 7, 8:
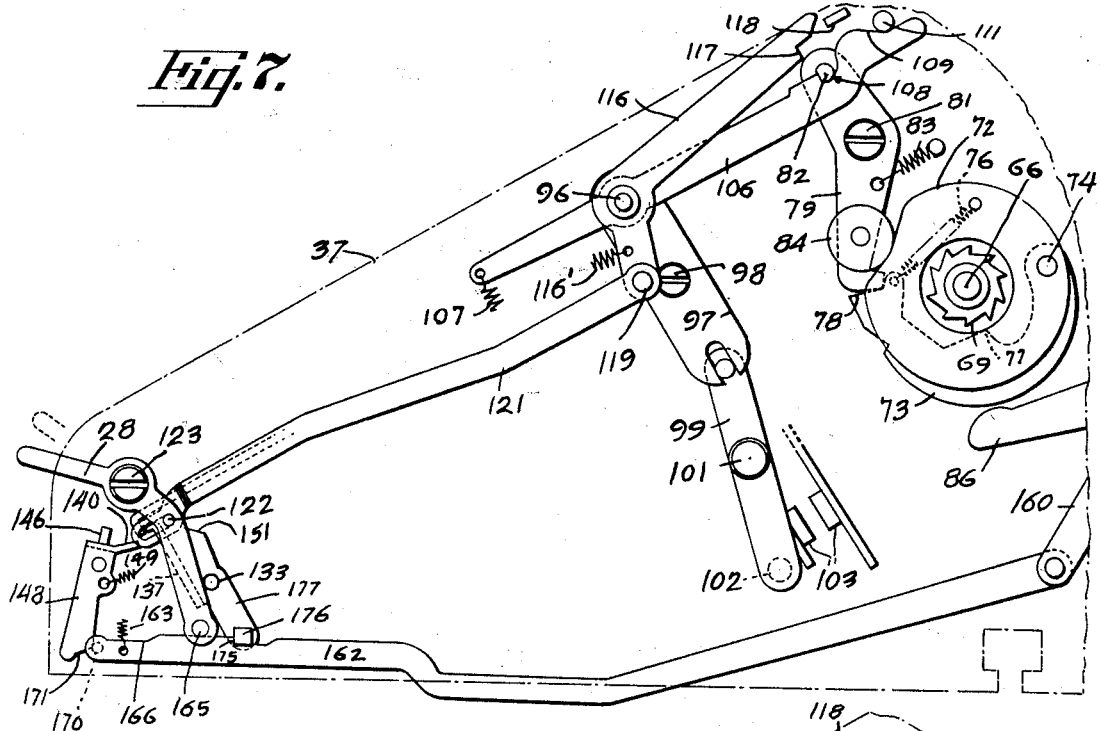
Figure 7 is a diagrammatic view of the parts with the add lever in active position.
Figure 8 is a diagrammatic view similar to Figure 7 showing the parts as positioned at the end of an operation with the stopping function being performed.

When the clutch is disengaged by control lever 79 (Fig. 7) shaft 66 overruns its full-cycle position under the momentum of the parts and the pawl 73 is swung outwardly beyond its normal disengaged position shown in Figure 7 to the position shown in Figure 8 by reason of the fact that while the shoulder 78 is held against clockwise movement by the nose of lever 79, the pivot 74 of pawl 73 rotates clockwise when the ring 72 on which it is mounted overruns full-cycle position. As a result the pawl 73 rotates counterclockwise relative to its pivot 74. In moving beyond its normal disengaged position the pawl 73 engages a lever 86 which acts as a resilient stop. The lever 86 (Fig. 5) is pivoted at 87 and has a strong tension spring 88 attached to its outer arm. A stop pin 89 restrains the lever from engaging the pawl 73 except when the pawl is swung outwardly as shown in Figure 8.

The strength of the spring 88 is preferably such that in the stopping operation the lever 86 will be rocked from the dotted to the full line position in Figure 8. When clockwise rotation of shaft 66 and associated parts has been arrested, the lever 86 becomes effective under the influence of its spring 88 to aid the centralizing roller 84 under the influence of the spring 83 to seat in the depression 85 of the ring 72 and return the shaft 66 to full-cycle position.

To control the clutch and the motor circuit, plus and minus keys 24 and 25 (Figs. 4 and 5) have associated therewith a slide 91 mounted for endwise sliding movement on the frame plate 92 (Fig. 4). This slide has a pair of cam surfaces 93 for engagement by respective pins 94 carried by the keys. Upon depression of one of keys 24 or 25, the slide 91 will be moved to the right as viewed in Figure 5. The slide 91 is provided with a vertical slot engaging a pin 96, carried at the upper end of a lever 97, pivoted at 98 on side plate 37. Lever 97 has an operating connection with a second lever 99, pivotally supported at 101, and having an insulated pin 102 for closing contacts 103 of the motor circuit. The levers 97 and 99 are adapted to be operated by mechanism not shown whereby other control keys of the mechanism may cause engagement of the clutch and closure of the motor circuit.

Cyclic control

Figure 9:
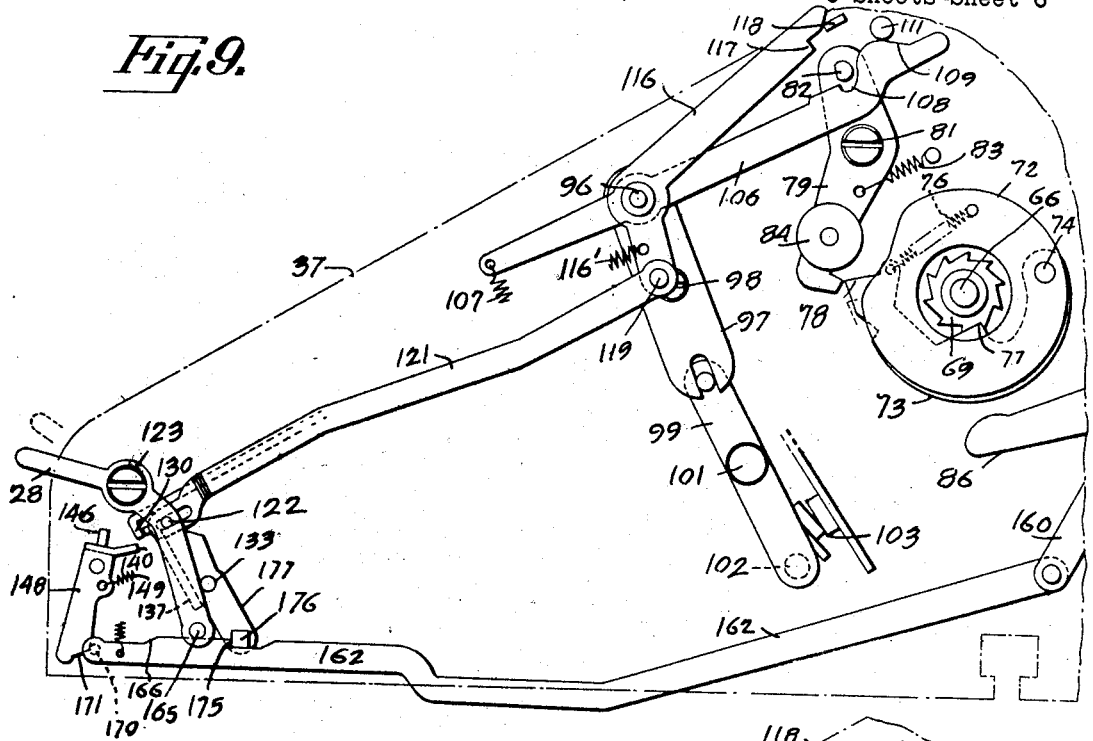
Figure 9 is a view similar to Figure 7 showing the parts as positioned with the clutch engaged.

The pin 96 (Fig. 7) provides the pivotal mounting for a single cycle or a uni-cyclic control lever 106 (Figs. 5 and 7) which is urged in a counterclockwise direction by spring 107 to engage its notch or seat 108 with pin 82 of clutch control lever 79. Adjacent to seat 108 the lever 106 is provided with a cam surface 109 for engagement with a pin 111 on the frame plate 37. Thus when lever 97 is rocked clockwise it moves lever 106 pivoted thereon to the right. In the first part of its movement the lever 106 rocks clutch control lever 79 to its clutch engaging position. However, as the lever 106 moves to the right it is rocked clockwise by the engagement of cam surface 109 with pin 111. As shown in Figure 9 the lever 79 has released the pawl 73 and the clutch is engaged and in addition in the last part of the movement of the lever 106 to the right and downwardly it has released the pin 82 so that the lever 79 is free to disengage the clutch even though the plus or minus keys are held down at the end of one cycle as shown in Figure 8. When the plus or minus key is released, the parts return to the positions shown in Figure 7. The plus or minus key may be released either in mid-cycle or after the cycle has been concluded. In either event the cutch control lever 79 disengages the clutch and, upon release of the key, the lever 97 withdraws the lever 106 to its original position where it reengages the pin 82.

To enable the operator to operate the machine continuously for a plurality of cycles means are provided, which when set, place the clutch lever 79 under the sole control of the plus and minus keys. Pivot pin 96 also provides a pivotal mounting for a bellcrank lever 116 which has a seat 117 at its rearward end for engagement with pin 82 in the position shown in Figure 5 to which position the lever 116 is normally urged by a spring 116'. In single cycle operation the lever 116 is elevated by means presently described to the position shown in Figure 7 free of the pin 82 and upon movement to the right will be maintained free of the pin by an ear 118 (Fig. 9) on plate 37 engaging the bevelled end of the bellcrank lever 116. The forward depending end of the bellcrank 116 is pivotally connected at 119 to a link 121 which extends forwardly of the machine and is slotted to engage a pin 122 on the add lever 28 which is pivoted at 123 on the side plate 37. Upon movement of the add lever 28 from the dotted line position (Fig. 7) to the full line position link 121 is moved rearwardly of the machine to rock the bellcrank lever 116 counterclockwise on its pivot 96 to disengage its seat 117 from the pin 82. With the add lever 28 in the down position the uni-cycle lever 106 is left in control.

Figure 10:
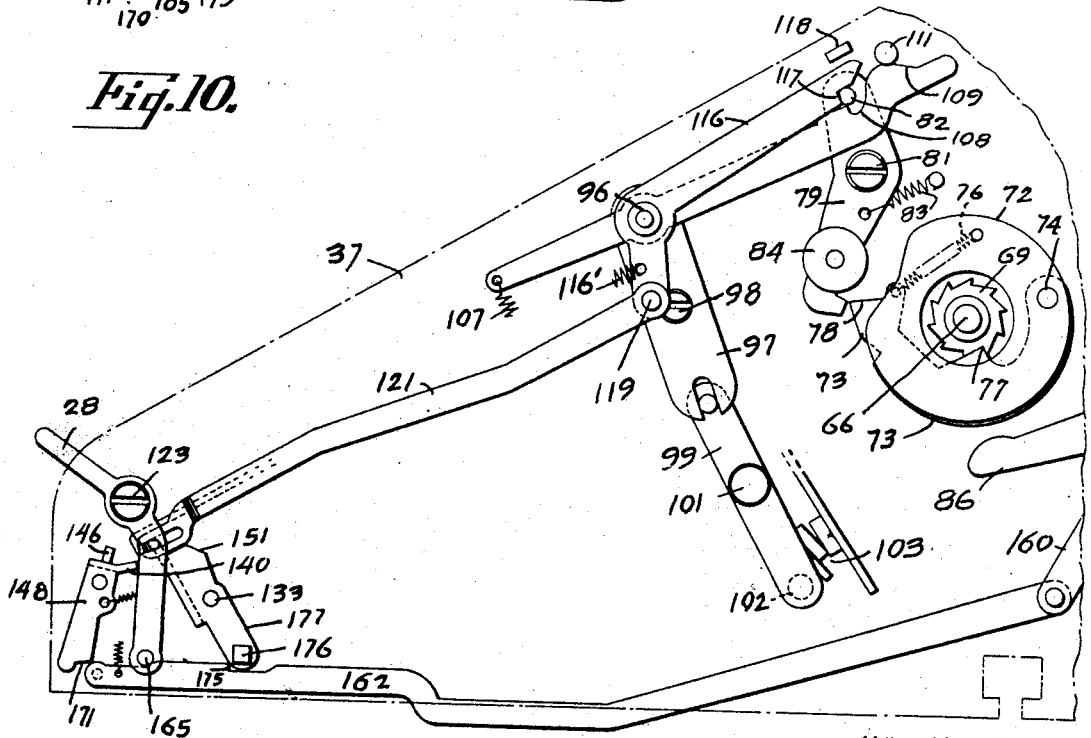
Figure 10 is a diagrammatic view similar to Figure 7 showing the parts conditioned for plural cycle operation with the clutch engaged at driving.

With the lever 28 in the up position, as shown in Figures 5 and 10, the seat 117 remains engaged with the pin 82. Therefore, when the operator depresses either the plus or minus key the lever 97 moves the lever 116 to the right from the Figure 5 position to the Figure 10 position, so that the clutch lever 79 is held out as long as the key is held depressed. When the key is released the parts return to the Figure 5 position where the clutch lever 79 engages the pawl 73 to disengage the clutch. Thus, with the lever 28 set for plural cycle operation the clutch remains engaged as long as the plus or minus key is held down.

*Keyboard clear*

It will be recalled that the numeral keys 21 are retained in depressed position by slides 44 (Fig. 2) which when moved forwardly release depressed keys. The front end of each slide has a downwardly-turned finger 130 (Fig. 3) formed thereon. Disposed behind the fingers 130 and extending transversely of the keyboard (Fig. 4) is the flange 131 of a bail 132 pivotally mounted as at 133 (Fig. 3). When the bail 132 is rocked forwardly it draws all the slides 44 forwardly, thus releasing all depressed keys 21 in the keyboard.

The keyboard can be locked by a gate 140 (Fig 4) which extends transversely of the keyboard in front of the fingers 130. This gate is pivotally mounted as at 141 (Fig. 3) so that it can be swung up and down. In the down position (Fig. 3) the gate 140 is disposed below the fingers 130 so that any or all of the slides 44 may be moved forwardly to release depressed keys when the gate is in this position. The bellcrank lever 29 (Figs. 1 and 6) is pivotally mounted in the frame so that it may be adjusted to up or down position. A pin 145 projects to the left from the lower end of the lever 29 into the path of a pin 146 which projects upwardly from the gate 140.

When lever 29 is down (Fig. 5) the gate 140 is down and the keyboard may be cleared. The gate 140 has a downwardly-extending arm 148 (Figs. 4 and 6) at the right end to which a spring 149 is attached. This spring urges the gate toward the up position and when the lever 29 is moved to its up position the gate 140 is resiliently held in the up position (Fig. 6) where it opposes forward movement of the fingers 130 and thus locks the keyboard.

When the gate 140 is down, depressed keys 12 may be released by depressing ordinal clear keys 22 or keyboard clear key 23. Key 23 (Fig. 5) has a laterally projecting pin 150 which overlies a cam 151 (Fig. 6) formed on the bail 132. Depression of clear key 23 rocks bail 132 forwardly.

When the add lever 28 is set in the down position (Fig. 7) to raise the tail of lever 116 off the pin 82 and leave the lever 106 free to control the clutch for single cycle operation, the lever 28 also conditions other mechanism which operates to clear the keyboard at the end of the single cycle. The lever 86 (Fig. 5) has a downwardly and forwardly extending arm 160 to which is pivotally connected at 161 a forwardly extending link 162. A spring 163 lifts the front end of link 162 which has an up and a down position controlled by the lever 28.

A pin 165 at the foot of lever 28 engages a depression 166 in the upper edge of the link 162 when the lever 28 is in the up position (Fig. 5). When the lever 28 is moved to the down position (Fig. 7) the pin 165 is swung upwardly in an arc, permitting the spring 163 to lift the front end of link 162.

Lifting the link 162 unlocks the keyboard if it is locked. A laterally extending pin 170 in the front end of link 162 underlies a cam edge 171 on arm 148 of gate 140. If the gate is in locking position (Fig. 6) it will be swung down when link 162 is lifted (Fig. 7).

Lifting the link 162 engages a shoulder 175 thereon with a square pin 176 projecting laterally from a leg 177 on the bail 132. When either the plus or minus key is depressed the clutch makes one revolution and stops. When it comes to a stop the lever 86 is rocked, as shown in Figure 8, drawing link 162 rearwardly. The rearward movement of link 162, through the engagement of shoulder 175 with square pin 176, causes the bail 132 to be rocked forwardly to clear the keyboard.

We claim:

1. In a calculating machine, having a register, actuating means therefor and cyclic drive means for said actuating means including a clutch; a clutch control element movable from clutch disengaging to a clutch engaging position, means for controlling said clutch control element including a pair of members operatively related thereto and simultaneously movable to cause movement of said element from a clutch disengaging to a clutch engaging position, and automatically operable means for causing one of said members to be disengaged from said clutch controlling element upon movement of said element to clutch engaging position.

2. In a calculating machine having a register, actuating means therefor and cyclically operable drive means for said actuating means; operation control means for said cyclically operable drive means including a member movable to initiate cyclic operation of said drive means, a control key, and a connection between said control key and said member including a pair of elements operatively related to said member to effect movement thereof, means for causing one of said members to move automatically out of operative relation with respect to said member, and settable means for moving the other of said elements out of operative relation with respect to said member.

3. In a calculating machine having a register, actuating means therefor and cyclically operable drive means for said actuating means: said drive means including a clutch, a clutch control member normally urged toward clutch disengaging position, means for moving said member to clutch engaging position including a lever adapted to be coupled to said member in the clutch disengaging position thereof, and means including a fixed element for uncoupling said lever from said member after said member has been moved to clutch engaging position to permit said member to return to clutch disengaging position, said means for moving said clutch control member including means adapted to be operatively conditioned by a settable means for preventing return of said member to clutch disengaging position until return of said moving means to original position.

4. In a calculating machine havng a register, actuating means therefor and cyclically operable drive means for said actuating means: said drive means including a clutch, a clutch control member normally urged toward clutch disengaging position, an operation control key, means operable upon depression of said key for moving said control member to clutch engaging positioning, said moving means including two levers adapted to engage said member, means for invariably disengaging one of said levers from said member after said member has been moved to clutch engaging position, and means selectively adjustable to permit or prevent engagement of said other lever with said member.

CARL M. FRIDEN.
ANTHONY B. MACHADO.